United States Patent Office 3,701,737
Patented Oct. 31, 1972

3,701,737
SODIUM CARBONATE-SODIUM BICARBONATE
AGGLOMERATES
David Goldstein, East Brunswick, N.J., assignor to FMC
Corporation, New York, N.Y.
No Drawing. Filed Oct. 30, 1970, Ser. No. 85,779
Int. Cl. C09k 3/00; H05b 33/00
U.S. Cl 252—182                                10 Claims

ABSTRACT OF THE DISCLOSURE

A low bulk density, absorptive agglomerate containing both sodium carbonate and sodium bicarbonate values, for use in mild detergent formulations, is produced by (a) agglomerating fine soda ash particles with water, (b) carbonating the resulting wet sodium carbonate monohydrate with carbon dioxide to obtain carbonated agglomerates having an $NaHCO_3:Na_2CO_3$ mole ratio of about 0.4:1 to about 1.5:1 as the product.

BACKGROUND OF THE INVENTION

(A) Field of the invention

The invention relates to a process of converting soda ash fines into carbonated agglomerates having a low bulk density, good flowability, improved absorptivity for surfactants, and whose decreased alkalinity, compared with soda ash, makes them suitable for use in mild detergent formulations.

(B) Description of the prior art

In the makeup of detergent formulations it is known that soda ash is frequently employed as one of the ingredients. Soda ash useful for this purpose is the so-called light bulk density soda ash having a bulk density of below 45 pounds per cubic foot. Recently, a low bulk density, highly absorptive soda ash has been developed for use in detergent formulations. The high absorptivity of this soda ash is desired because it permits larger amounts of a surface active agent to be combined with the soda ash without forming a sticky and difficulty handled mixture; the process for producing this aborptive soda ash is described in U.S. patent application Ser. No. 85,780 filed in the name of the present inventor, and on even date herewith.

However, this low bulk density, highly absorptive soda ash is not suitable for use in mild detergent formulations because soda ash is relatively alkaline; a 1% aqueous soda ash solution yields a pH of about 11.5. Accordingly, it is desired to create a product which, like the absorptive soda ash described above, has a low bulk density (below 45 pounds per cubic foot) but whose alkalinity is much lower than conventional soda ash.

One product which has been used in an attempt to fill this need is sodium sesquicarbonate $$(Na_2HCO_3 \cdot Na_2CO_3 \cdot 2H_2O)$$

This product is less alkaline than soda ash but it suffers the drawback that it has a relatively high bulk density on the order of 45 pounds per cubic foot or more and further is not absorptive.

As a result there is a need in the art for a modified soda ash product which is less alkaline and which has a lower bulk density compared with conventional soda ash.

SUMMARY OF THE INVENTION

In accordance with the present invention sodium carbonate, sodium carbonate monohydrate or mixtures thereof are contacted with an aqueous medium and agglomerated at temperatures of about 35 to 109° C., to yield wet agglomerates containing 20 to 28% by weight water, the wet agglomerates are reacted with carbon dioxide gas in amounts sufficient to obtain a carbonated agglomerate having a mole ratio of $NaHCO_3:Na_2CO_3$ of about 0.4:1 to about 1.5:1 (and preferably 0.7:1 to 1:1) and free flowing, carbonated agglomerates are recovered having greater absorptivity than their precursor sodium carbonate and having a bulk density below about 45 pounds per cubic foot. Optionally, the carbonated agglomerates may also be further treated to increase their absorptivity by partially calcining them to remove some bicarbonate values so that the final agglomerates have a mole ratio of $NaHCO_3:Na_2CO_3$ of about 0.4:1 to 0.6:1.

DESCRIPTION OF THE INVENTION AND THE PREFERRED EMBODIMENTS

In carrying out the present invention, the feed which is utilized can be fine particles containing either sodium carbonate monohydrate, anhydrous sodium carbonate or mixtures of these components. A preferred feed is the dust by-product which is obtained during the calcination of either sodium sesquicarbonate, sodium carbonate monohydrate or other precursor salts which are heated to form soda ash. The size of the feed particles utilized in the process preferably are fines, that is, fine particles whose major proportion is less than 100 mesh. Typical soda ash fines may have a size of 100% minus 20 mesh, 95% minus 60 mesh, 75 to 85% minus 80 mesh and 60 to 80% minus 100 mesh.

These fines are placed in a rotary drum or pan granulator and sprayed with an aqueous medium which may be simply water or an aqueous solution containing sodium cations and either carbonate and/or bicarbonate ions. The temperature of the water and granules is maintained within the range of 35 to 109° C.; these temperatures result in the production of sodium carbonate monohydrate and avoid the higher hydrates of sodium carbonate such as the heptahydrate or decahydrate. These latter hydrates are undesirable in the present process since they produce very weak granular products.

The fines are agglomerated in the rotary drum or pan granulator into wet agglomerates, essentially having a size range of —20 plus 100 mesh. Agglomeration of the fines commences to occur after sufficient water has been sprayed on the fines to convert them substantially to sodium carbonate monohydrate; sodium carbonate monohydrate contains 14.5% water. Additional water is sprayed on the agglomerates until a wet agglomerated product is obtained that contains from 20 to 28% by weight total water. The wet granular agglomerates of the preferred size have a final water content of from 23 to 25% by weight total water; this constitutes about 76 to 100% in excess of the water required to form sodium carbonate monohydrate. If less water is used than the amount set forth above, an increase in the number of undersized particles is obtained from the agglomerator spill; if, more water is utilized than the amount seta forth above, oversized agglomerates are produced, that is, an excessive amount of particles larger than 20 mesh.

The resulting wet agglomerates are reacted with carbon dioxide gas to convert at least a portion of the sodium carbonate monohydrate to sodium sesquicarbonate. The reaction likely takes place in accordance with the following equation.

$$3Na_2CO_3 \cdot H_2O + 2H_2O + CO_2 \rightarrow 2Na_2CO_3 \cdot NaHCO_3 \cdot 2H_2O$$

In the event that some soda ash is present which has not been hydrated to the monohydrate, the reaction of the soda ash likely takes place according to the following equation.

$$3Na_2CO_3 + 5H_2O + CO_2 \rightarrow 2Na_2CO_3 \cdot NaHCO_3 \cdot 2H_2O$$

The reaction of the carbon dioxide and the wet agglomerates can be carried out in any solid-gas treating apparatus such as a fluidized bed, a rotary tube with flights or the like. The reaction may be permitted to take place at temperatures of from 35 to 109° C. although temperatures of 35° to 90° C. are prefererd. Further, it is desirable to maintain the partial pressure of the $CO_2$ in the reactor as high as possible, e.g. 0.5 to 1 atmosphere, to obtain and maintain a rapid reaction rate between the $CO_2$ and the wet agglomerates.

During the carbonation of the wet agglomerates, the reaction is exothermic and large quantities of heat are evolved which can raise the temperature of the carbonated agglomerates. Accordingly, it is desirable to utilize some heat exchange equipment in order to avoid raising the temperature of the carbonated agglomerates above 90° C. Above this temperature, carbonation proceeds at a slower rate and reduces the efficiency of the carbonation stage.

The carbonation of the wet agglomerate may be carried out until all or a portion of the sodium carbonate has been converted to sodium sesquicarbonate. Further carbonation may be carried out to convert a portion of the sodium sesquicarbonate to sodium bicrabonate according to the following equation.

$$NaHCO_3 \cdot Na_2CO_3 \cdot 2H_2O + CO_2 \rightarrow 3NaHCO_3 + H_2O$$

Carbon dioxide is reacted with the wet agglomerates until the mole ratio of sodium bicrabonate:sodium carbonate has reached from 0.4:1 to 1.5:1. In computing this ratio, all sodium bicarbonate values and all sodium carbonate values, no matter what form they are in, e.g. as sodium sesquicarbonate or sodium carbonate monohydrate, are utilized in determining the formulation. The extent of carbonation should be limited so that the final carbonated agglomerates do not exceed a mole ratio of $$NaHCO_3 : Na_2CO_3$$

of about 1.5:1. Carbonation beyond this ratio, up to essentially sodium bicarbonate, can be readily achieved but is undesired for two reasons. Initially, the absorbtivity of the final product decreases when carbonation extends beyond the mole ratio of 1.5:1 set forth above. Secondly, carbonation beyond ratios of 1.5:1 lead to a product which becomes progressively weaker and frangible with increased carbonation. Essentially, agglomerates, which have been carbonated to mole ratios of $NaHCO_3:Na_2CO_3$ of 0.4:1 to 1.5:1, appear to have the lowest degree of frangibility (greatest strength) and to also have maximum absorptivity.

In carrying out the above carbonation step, it is essential that the agglomerates which are to be carbonated contain excess water beyond that sufficient to produce the sodium carbonate monohydrate; that is, the agglomerates must be wet and contain from 20 to 28% total water. This amount of water is sufficient to form the sodium carbonate monohydrate plus free water. Surprisingly, the free water permits the carbonation reaction to proceed quickly and effectively. It has been found that if the carbonation is attempted without this free water, the reaction does not take place to any appreciable extent. Accordingly, the inclusion of free water during the carbonation of the sodium carbonate monohydrate agglomerates is a feature of the present invention.

The resulting carbonated agglomerates usually contain very little free water subsequent to the carbonation stage. The elevated temperatures employed during carbonation and the chemical reactions that result normally remove most of the free water. If the carbonated agglomerates do contain free water, they may be mildly heated to evaporate all such water, if desired. The dry carbonated agglomerates are then screened to remove the −20 mesh fraction as product. The +20 mesh oversized fraction from the carbonator is ground and returned to the screen to separate additional −20 mesh particles.

The resulting carbonated agglomerates when made up into a 1% aqueous solution have been found to yield pH values within the range of about 9.8 to about 10.2; an average figure obtained for comparable 1% soda ash solutions is about 11.5. As a result, the carbonated agglomerates have been found to be exceptionally suitable for use in formulating mild detergent formulations where high alkalinity is not desired.

The carbonated agglomerates also are desirable in formulating dry detergent formulations because they are strong (low frangibility) and because they have greater absorptivity for surfactants that conventional alkali carbonate-bicarbonate salts, e.g. sodium sesquicarbonate. The absorptivity is the ability of a particulate salt to absorb a standard surfactant while remaining flowable and without exuding any of the surfactant onto an absorbent surface. The absorptivity test is conducted by mixing 500 g. of a sample in a Hobart mixer with 25 ml. increments of Triton X-100 (isooctylphenyl polyethoxyethanol) liquid surfactant from a burette. After the addition of each increment of liquid surfactant, mixing is continued for a period of three minutes. The mixing is stopped after this period and a small sample is placed in a 4-dram vial. The vial is rotated and visually observed for flowability (or clumping) and sticking to the vial's surface. The results are reported in terms of the percent by weight of Triton X–100 which can be absorbed in the granules before flowability becomes impaired.

A verification of the absorptivity can also be obtained by placing the sample on a No. 40 Whatman filter paper and pressing the sample on the paper. If no specks of surfactant appear after allowing the sample to stand on the paper for two hours, then no run off of the surfactant has occurred. For example, if the absorptivity of a sample is 25–30%, then samples of the particulate salt will absorb at least 25% by weight of the initial sample of surfactant and will not speck a Whatman filter paper with that amount of surfactant; at higher levels of surfactant, i.e. 30% by weight of the initial sample, specks will show up on the filter paper and the flowability of the sample will be impaired when tested in a vial. Therefore, the absorptivity lies somewhere between 25 and 30%.

Another important property of the instant product is that its frangibility is very low. The frangibility is determined by taking a sample of over 100 g. of the 20–100 mesh granules of carbonated agglomerates and screening them for five minutes on a 100 mesh screen in a Ro-tap machine to remove any −100 mesh dust particles adhering to the granules. Thereafter 100 g. of the screened material is rescreened on the Ro-tap for fifteen minutes on a 100 mesh screen containing three 1⅜ inch diameter gum rubber balls, each weighing between 25–29 g. The −100 mesh material from this test is reported as the percent breakdown or frangibility.

If greater absorptivity is desired for the final carbonated agglomerates, this can be obtained by treating the −20 mesh carbonated agglomerates to a partial calcining step. Suitable calcining temperatures are from about 60 to 250° C. The partial calcination can be carried out in any suitable form of equipment such as a rotary kiln, a fluidized reactor or the like. During this calcining operation both carbon dioxide and water vapor are evolved until the product has reached an $NaHCO_3:Na_2CO_3$ mole ratio of about 0.4:1 to 0.6:1. When performing this calcining operation, the preferred carbonated agglomerates fed to a calciner are those containing $NaHCO_3Na_2CO_3$ mole ratios within the range of 0.7:1 to 1.5:1 and preferably 0.7:1 to 1:1. The resulting partial calcination is continued until it reduces the $NaHCO_3:Na_2CO_3$ mole ratios of the product to not lower than about 0.4:1.

This partial calcining step results in an improved absorptivity. The reason for the increased absorptivity is not known but may be due to an increase in the pore volume of the product. More specifically, the partially calcined product appears to have a higher porosity than its precursor non-calcined agglomerate and substantial pore volume greater than 1 micron are apparently created by the partial calcining treatment. However, regardless of the reason for the increase in absorptivity, it is clear that the partial calcining operation is responsible for this result. It should be further understood that this partial calcining step is an optional step, useful when a product having increased absorptivity is desired. It is not necessary to partially calcine the carbonated agglomerates to obtain a product having acceptable absorptivity for many detergent applications.

Soda ash fines which are useful as the feed material for the present invention can readily be obtained from the process of producing soda ash set forth in U.S. Pat. 3,028,-215 issued to Frint on Apr. 3, 1962. In this patented process the soda ash is produced by calcining a sodium sesquicarbonate. During the calcination, substantial amounts of fines are removed from the kiln with the exhaust gases and are recovered from the gases in a separator. These fines are substantially calcined soda ash with traces of sodium sesquicarbonate and precursor carbonates present. They have been found to be most suitable for use as the feed in the present invention. In some instances conventional soda ash produced by the above patented process or by other known methods use more than one calcination stage. The soda ash fines which are unavoidably carried off with the exhaust gases during either calcining stage is suitable for use as feed material in the present invention. Since these fines normally constitute an undesired fraction of the soda ash product, the present process is highly advantageous in that it turns these undesired soda ash fines into a more valuable product which has a high market demand.

The following examples are given to illustrate the invention but are not deemed to be limiting thereof.

EXAMPLE 1

Soda ash calciner fines recovered from the process for producing soda ash set forth in U.S. Pat. 3,028,215 issued to Frint on Apr. 3, 1962 were used as the feed in the following example. The screen analysis of the feed was as follows:

| Mesh: | Percent wt. retained on screen |
|---|---|
| +20 | 0 |
| +60 | 5–8 |
| +80 | 14–25 |
| +100 | 18–42 |
| −100 | 58–82 |

The soda ash fines were preheated and fed through a screw feeder onto a 14-inch Dravo-Lurgi pelletizing disk at a rate of 44 lb./hour; the pelletizing disk angle was 45° and rotated at 33 r.p.m. Preheated water, at 50 to 60° C. was sprayed into the bed of fines through an atomizing spray nozzle and the bed temperature on the disk maintained at 55 to 65° C. The flow rate of water was maintained such that the wet agglomerated fines contained 24–25% total water. This amount of water was sufficient to theoretically convert all the soda ash to sodium carbonate monohydrate and to maintain free water in the agglomerates. The wet agglomerates from the disk flowed by gravity into a rotating tube, 7 ft. long and having a 6½-inch I.D., which served as a rotating carbonator. The carbonator had a slope of 0.25 inch/foot and rotated at 38 r.p.m. Flights were present in the rotating tube to shower the wet agglomerates and provide sufficient exposed surface area to incoming carbon dioxide. A 1-inch dam was located at the discharge end of the carbonator. Carbon dioxide was metered into the carbonator at the discharge end, countercurrent to the flow of the wet agglomerates, at a flow rate of 0.9–1.1 c.f.m., at a temperature of 25° C. and at atmospheric pressure. A sealed housing was located at the discharge end of the rotating carbonator to minimize air leakage; under these conditions the partial pressure of incoming $CO_2$ was about 1 atmosphere. A rotary air-lock valve discharged the final product at about 70° C. into a vibrating screen which continuously screened oversized carbonated material (+20 mesh) from the desired product (−20 mesh). A total of 2,963 lbs. of −20 mesh carbonated agglomerates were produced in this manner. The oversize (+20 mesh) material amounted to 268 lbs. or 8.3% by weight of the total carbonated agglomerates produced. This oversized material may be crushed for recovery of additional −20 mesh particles. The properties of the carbonated agglomerates are set forth in Table I.

The term "bulk density" as utilized in the specification, claims and in Table I is the apparent bulk density which is determined by weighing a given volume of the sample whose bulk density is to be determined; the volume is measured with the material in a loosely-packed condition without packing or tamping to remove the voids between the particles. The weight of this volume of sample is then converted into its equivalent weight per one cubic foot of the loosely-packed material.

EXAMPLE 2

The same procedure and equipment was used in carrying out the present example except that 3,621 lbs. of carbonated agglomerates were produced in which the average $NaHCO_3:Na_2CO_3$ mole ratio was 0.83:1 instead of 0.92:1 as obtained in Example 1. The properties of the carbonated agglomerates are set forth in Table I.

EXAMPLE 3

Soda ash fines were agglomerated and carbonated in a manner similar to that given in Example 1 except that $CO_2$ flows were varied substantially during two runs so as to yield carbonated agglomerates containing widely varying $NaHCO_3:Na_2CO_3$ mole ratios as set forth in Table I. The physical properties of the resulting carbonated agglomerates were determined, and are listed in Table I.

EXAMPLE 4

A 700 g. sample of carbonated agglomerates, made under the conditions specified in Example 2, had a mole ratio of 0.84:1. These carbonated agglomerates were then partially calcined by the following procedure. The 700 g. sample of carbonated agglomerates was placed in a vertically positioned 4-inch glass tube which was used as a fluidized bed reactor. Air was preheated to 100° C. by passing it through an electric heater and then directed upwardly through the fluid bed at 3.5 s.c.f.m. The air flowing upwards through the bed acted as a fluidizing medium and supplied heat to dry and partially calcine the carbonated agglomerates. After calcination for 1 hour at a fluid bed temperature of 65° C., the resulting carbonated agglomerates had an $NaHCO_3:Na_2CO_3$ mole ratio of 0.52:1. The partially calcined agglomerates were then removed from the bed and their physical properties were determined and are set forth in Table I.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described an exemplified herein.

TABLE I

| Ex. No. | NaHCO₃:Na₂CO₃ mole ratio | Screen analysis (U.S. Sieve) percent by wt. | | | | | | Bulk density, lbs./cu. ft. | Percent | | pH of 1% solution |
|---|---|---|---|---|---|---|---|---|---|---|---|
| | | +20 | +40 | +60 | +80 | +100 | −100 | | Frangibility | Absorptivity | |
| 1 | 0.92 | 0.6 | 33.3 | 83.7 | 92.7 | 95.5 | 4.5 | 41.0 | 4.0 | 5–10 | 9.8 |
| 2 | 0.83 | 0.1 | 35.0 | 82.5 | 93.1 | 97.1 | 2.9 | 38.7 | 3.0 | 5–10 | 9.9 |
| 3–1 | 1.18 | 0.2 | 38.2 | 83.1 | 94.3 | 98.9 | 1.1 | 40.5 | 5.0 | 5–10 | 9.9 |
| 3–2 | 0.61 | 0.4 | 42.1 | 85.1 | 94.7 | 97.4 | 2.6 | 43.5 | 4.1 | 5–10 | 10.2 |
| 4 | ¹ 0.52 | 0.2 | 33.9 | 79.1 | 92.0 | 95.8 | 4.1 | 35.8 | 6.0 | 10–15 | 10.1 |

¹ Material having an NaHCO₃:Na₂CO₃ mole ratio of 0.84:1 was calcined to this ratio.

What is claimed is:

1. Process for producing agglomerates containing sodium carbonate and sodium bicarbonate values comprising contacting particles containing a member selected from the group consisting of sodium carbonate and sodium carbonate monohydrate with an aqueous medium, agglomerating the resulting mixture at temperatures of about 35 to about 109° C. so as to obtain wet agglomerates containing 20 to 28% by weight water, reacting the wet agglomerates with carbon dioxide gas in amounts sufficient to obtain agglomerates having a mole ratio of $$NaHCO_3:Na_2CO_3$$

of about 0.4:1 to about 1.5:1 and recovering free flowing, absorptive, carbonated agglomerates having a bulk density of below 45 pounds per cubic foot.

2. Process of claim 1 wherein said carbonated agglomerates have a bulk density of 38 to 44 pounds per cubic foot.

3. Process of claim 1 wherein the carbonated agglomerates have an NaHCO₃:Na₂CO₃ mole ratio of about 0.7:1 to 1:1.

4. Process of claim 1 wherein said wet agglomerates have a water content of about 23 to about 25% by weight.

5. Process of claim 1 wherein said aqueous medium is selected from the group consisting of water and aqueous solutions of sodium cations and anions selected from the group consisting of carbonate and bicarbonate.

6. Process of claim 1 wherein the partial pressure of CO₂ is at least about 0.5 atmosphere.

7. Process of claim 1 wherein the wet agglomerates are reacted with CO₂ at a temperature of from about 35° C. to about 90° C.

8. Process of claim 1 wherein said carbonated agglomerates have an NaHCO₃:Na₂CO₃ mole ratio of 0.7:1 to 1.5:1 and said carbonated agglomerates are partially calcined to yield final agglomerates having an $$NaHCO_3:Na_2CO_3$$

mole ratio of about 0.4:1 to 0.6:1 and have increased absorptivity than their precursor non-calcined agglomerates.

9. Process of claim 8 wherein said final agglomerates have a bulk density of 35–38 pounds per cubic foot.

10. Process of claim 1 wherein said agglomerates have a size of substantially −20 to +100 mesh.

References Cited
UNITED STATES PATENTS

| | | | |
|---|---|---|---|
| 2,626,852 | 1/1953 | Byrns | 23—64 |
| 3,188,170 | 6/1965 | Mantz | 23—63 |
| 3,295,930 | 1/1967 | Swanson | 23—63 |

JOHN D. WELSH, Primary Examiner

U.S. Cl. X.R.

23—63, 64, 313